United States Patent
Li et al.

(10) Patent No.: US 11,410,285 B2
(45) Date of Patent: Aug. 9, 2022

(54) METHOD AND APPARATUS FOR IMAGE PROCESSING

(71) Applicant: BEIJING DAJIA INTERNET INFORMATION TECHNOLOGY CO., LTD., Beijing (CN)

(72) Inventors: Le Li, Beijing (CN); Xiaokun Liu, Beijing (CN); Zhen Lu, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/388,933

(22) Filed: Jul. 29, 2021

(65) Prior Publication Data

US 2022/0207677 A1  Jun. 30, 2022

(30) Foreign Application Priority Data

Dec. 29, 2020  (CN) .......................... 202011599325.8

(51) Int. Cl.
*G06T 5/50* (2006.01)
*H04N 9/67* (2006.01)
(Continued)

(52) U.S. Cl.
CPC .................. *G06T 5/50* (2013.01); *G06T 7/90* (2017.01); *G06V 10/46* (2022.01); *G06V 40/168* (2022.01);
(Continued)

(58) Field of Classification Search
CPC ... G06T 5/50; G06T 7/90; G06T 2207/20221; G06T 2207/30201; H04N 5/243;
(Continued)

(56) References Cited

U.S. PATENT DOCUMENTS 7,120,278 B2 * 10/2006 Sukegawa ............ G06K 9/6255
  382/118
7,593,603 B1 * 9/2009 Wilensky .................. G06T 5/00
  358/1.2

(Continued)

OTHER PUBLICATIONS

European Patent Office, Search Report for EP application 21187943.2, dated Jan. 21, 2022.

(Continued)

*Primary Examiner* — Duy M Dang
(74) *Attorney, Agent, or Firm* — Timothy W. Menasco, Esq.; Harter Secrest & Emery LLP

(57) ABSTRACT

A method for processing an image, an electronic device and a storage medium are provided. The method includes acquiring a first face image; extracting a face highlight area from the first face image, in which the face highlight area is an area having a brightness value not lower than a first predetermined brightness threshold in a face area of the first face image; obtaining a second face image by decreasing the brightness value of the face highlight area based on a predetermined highlight darkening parameter; obtaining a third face image by converting a color format of the second face image into a RGB color format and decreasing an intensity of each color channel of each pixel in the second face image, and obtaining a target face image by blending the third face image and the first face image.

20 Claims, 8 Drawing Sheets

(51) Int. Cl.
  *H04N 5/243* (2006.01)
  *G06T 7/90* (2017.01)
  *G06V 10/46* (2022.01)
  *G06V 40/16* (2022.01)
(52) U.S. Cl.
  CPC .............. *H04N 5/243* (2013.01); *H04N 9/67* (2013.01); *G06T 2207/20221* (2013.01); *G06T 2207/30201* (2013.01)
(58) Field of Classification Search
  CPC .... H04N 9/67; G06K 9/00268; G06V 40/168; G06V 10/46
  See application file for complete search history.

(56) References Cited

U.S. PATENT DOCUMENTS 7,978,909 B2 * 7/2011 Umeda ................ G06K 9/0061
382/162
2004/0170337 A1 9/2004 Simon et al.

OTHER PUBLICATIONS

Alessandro Artusi, Francesco Banterle, and Dmitry Chetverikov, A Survey of Specularity Removal Methods, Computer Graphics Forum.

* cited by examiner

METHOD AND APPARATUS FOR IMAGE PROCESSING

CROSS REFERENCE TO RELATED APPLICATIONS

The present application is based on and claim priority under 35 U.S.C. § 119 to Chinese Application No. 202011599325.8, filed with the China National Intellectual Property Administration on Dec. 29, 2020, the entire content of which is incorporated herein by reference.

FIELD

The disclosure relates to a computer technology field, and particularly, to a method and an apparatus for processing an image, an electronic device, and a storage medium.

BACKGROUND

With development of society and science, a beauty processing technology is widely used in a field of image processing, since the beauty processing technology may improve person's appearance in an image.

At present, when beauty processing is performed on an image, for example, to implement a vaporific and matte effect with sense of high quality, the image is typically adjusted manually in combination with a photo editor such as Photoshop, to achieve an expect beauty effect.

SUMMARY

The disclosure provides a method and an apparatus for processing an image, an electronic device and a storage medium.

The technical solution of the disclosure will be described as follows.

According to embodiments of a first aspect of the disclosure, a method for processing an image is provided. The method includes: acquiring a first face image, in which the first face image is in a Lab color format; extracting a face highlight area from the first face image, wherein the face highlight area is an area having a brightness value not lower than a first predetermined brightness threshold in a face area of the first face image; obtaining a second face image by decreasing the brightness value of the face highlight area based on a predetermined highlight darkening parameter; obtaining a third face image by converting a color format of the second face image into a RGB color format and decreasing an intensity of each color channel of each pixel in the second face image, and obtaining a target face image by blending the third face image and the first face image.

According to embodiments of a second aspect of the disclosure, an apparatus for processing an image is provided. The apparatus includes: an acquiring module, a first extracting module, a first processing module, a second processing module and a third processing module. The acquiring module is configured to acquire a first face image, in which the first face image is in a Lab color format. The first extracting module is configured to extract a face highlight area from the first face image, wherein the face highlight area is an area having a brightness value not lower than a first predetermined brightness threshold in a face area of the first face image. The first processing module is configured to obtain a second face image by decreasing the brightness value of the face highlight area based on a predetermined highlight darkening parameter. The second processing module is configured to obtain a third face image by converting a color format of the first face image into a RGB color format and decreasing an intensity of each color channel of each pixel in the first face image. The third processing module is configured to obtain a target face image by blending the third face image and the first face image.

According to embodiments of a third aspect of the disclosure, an electronic device is provided. The electronic device includes a processor and a memory. The memory is configured to store instructions executable by the processor; the processor is configured to execute the instructions to implement the method for processing an image according to the embodiments of the first aspect.

According to embodiments of a fourth aspect of the disclosure, a computer-readable storage medium is provided. When instructions in the computer-readable storage medium are executed by a processor of an electronic device, the processor is caused to implement the method for processing an image according to the embodiments of the first aspect.

According to embodiments of a fifth aspect of the disclosure, a computer program product is provided. The computer program product includes a computer program. When the computer program is executed by a processor, the processor is caused to implement the method for processing an image according to the embodiments of the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of the specification, illustrate embodiments consistent with the disclosure and, together with the description, serve to explain the principles of the disclosure and are not to be construed as limiting the disclosure.

DETAILED DESCRIPTION

Figure 1:
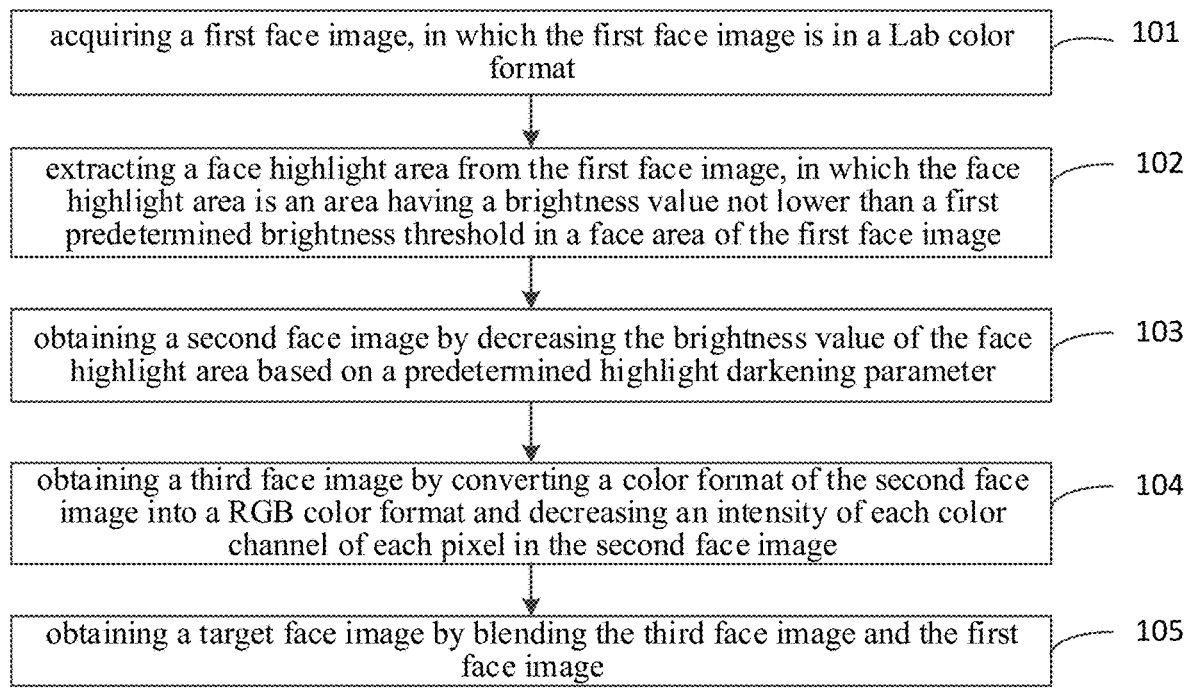
FIG. 1 is a flow chart illustrating a method for processing an image according to an embodiment.

In order to make the technical solution of the disclosure better understood, the technical solution in embodiments of the disclosure will be clearly and completely described below with reference to the accompanying drawings.

It should be noted that the terms "first", "second" and the like in the specification and claim of the disclosure and in the foregoing drawings are used for distinguishing between similar elements and not necessarily for describing a certain sequential or chronological order. It is to be understood that the data so used is interchangeable under appropriate circumstances such that embodiments of the disclosure described herein are capable of operation in other sequences than those illustrated or described herein. Implementations described in the exemplary embodiments below do not represent all implementations consistent with the disclosure. Rather, they are merely examples of the apparatus and method consistent with certain aspects of the disclosure, as detailed in the appended claims.

With development of society and science, a beauty processing technology is widely used in a field of image processing, since the beauty processing technology may improve the person's appearance in an image.

At present, when the beauty processing is performed on an image, for example, to implement a vaporific and matte effect with sense of high quality, the image is typically adjusted manually in combination with a photo editor such as Photoshop, to achieve an expect beauty effect. In this way, a photo editing technique is required, which cannot fulfill mass requirements and may waste a long time and a lot of effort of a user, thereby leading to a poor user experience.

The disclosure aims to solve the problem that mass requirements cannot be fulfilled due to a need of a photo editing technique and that the user experience is poor due to a waste of a long time and a lot of effort in the existing image processing method in the related art, such that a method for processing an image is provided. With the method for processing an image according to the embodiments of the disclosure, after acquiring a first face image which is in a Lab color format, a face highlight area is extracted from the first face image. The face highlight area is an area having a brightness value not lower than a first predetermined brightness threshold in a face area of the first face image. The brightness value of the face highlight area is decreased based on a predetermined highlight darkening parameter to obtain a second face image, a color format of the second face image is converted into a RGB color format and an intensity of each color channel of each pixel in the second face image is decreased to obtain a third face image. The third face image and the first face image are blended to obtain a target face image. In this way, a vaporific and matte effect of the face image may be achieved automatically in real time, which may save time and effort of the user and may be widely used.

The method for processing an image according to embodiments of the disclosure will be described in detail below with reference to the accompanying drawings.

FIG. 1 is a flow chart illustrating a method for processing an image according to an embodiment.

It should be noted that, an execution subject of the method for processing an image may be an apparatus for processing an image, which may be an electronic device or be configured in an electronic device, to automatically process a face image to be processed in real time, thus saving time and effort of a user and expanding an application range.

The electronic device may be a static or movable computing device having an image processing function. For example, the electronic device may be a movable computer device such as a notebook computer, a smart phone, a wearable device, or may be a static computing device such as a desktop computer, or may be another type of computing device. The apparatus for processing an image may be an application installed in the electronic device, or a software management tool of software products, which is not limited herein. The embodiment is described by taking the apparatus for processing an image as an application installed in the electronic device.

As illustrated in FIG. 1, the method includes the following.

In block 101, a first face image is acquired. The first face image is in a Lab color format.

The first face image is an image including a face. For example, the first face image may be a frame image from a video or a static image, which is not limited herein.

In an embodiment, the electronic device including the apparatus for processing an image may be configured with an image collecting device, such as a camera. After the image collecting device collects a face image, the image collecting device may send the face image to be processed to the apparatus for processing an image, such that the apparatus for processing an image may process the acquired face image. Or the apparatus for processing an image may process a face image acquired by another electronic device. In other words, the face image acquired by the apparatus for processing an image may be acquired by the electronic device including the apparatus for processing an image or acquired by another electronic device, which is not limited herein.

In an embodiment, the first face image may be in the Lab color format. The Lab color format consists of three elements, including element L related to luminosity, and elements a and b related to color. L represents luminosity, a represents a color range from carmine to green, and b represents a color range from yellow to blue.

In block 102, a face highlight area is extracted from the first face image. The face highlight area is an area having a brightness value not lower than a first predetermined brightness threshold in a face area of the first face image.

The first predetermined brightness threshold may be set arbitrarily based on requirements, which is not limited herein.

The brightness value may be a normalized brightness value.

In an embodiment, the face area of the first face image may be determined based on face key point information in the first face image, the brightness value of each pixel in the face area is compared with the first predetermined brightness threshold, and the area containing pixels each having the brightness value no less than the first predetermined brightness threshold in the face area is determined as the face highlight area, such that the face highlight area in the first face image can be acquired.

Alternatively, in an embodiment, the brightness value of each pixel in the first face image is compared with the first predetermined brightness threshold, an area containing pixels each having the brightness value no less than the first predetermined brightness threshold in the first face image is determined as a highlight area in the first face image, and the face highlight area is extracted from the highlight area based on the face key point information in the first face image, such that the face highlight area in the first face image can be acquired.

It should be noted that, in the embodiment, there may be one face highlight area or a plurality of face highlight areas extracted from the first face image, which is not limited herein.

In block 103, a second face image is obtained by decreasing the brightness value of the face highlight area based on a predetermined highlight darkening parameter.

The highlight darkening parameter is configured to adjust the brightness value of the face highlight area in the first face image, and can be set based on requirements, which is not limited herein.

In an embodiment, the brightness value of the face highlight area may be decreased based on the predetermined highlight darkening parameter by using formula (1):

$$L_{upd}=L'*b \quad (1)$$

where L' represents a current (i.e., unadjusted) brightness value of a pixel in the face highlight area of the first face image. $L_{upd}$ represents an adjusted brightness value of the pixel in the face highlight area of the first face image t, i.e., a brightness value of a corresponding pixel in the face highlight area of the second face image. b represents the highlight darkening parameter. In an embodiment, a value range of b may be set to be greater than 0 and less than 1, and a specific value of b can be set arbitrarily based on requirements, such that the brightness value of each pixel in the face highlight area can be decreased based on the highlight darkening parameter b.

In detail, by processing the current brightness value of each pixel in the face highlight area of the first face image based on the highlight darkening parameter using formula (1), the current brightness value of each pixel in the face highlight area of the first face image can be decreased to obtain the second face image.

For example, assume that the highlight darkening parameter b is 0.9, the brightness value of pixel X1 in the face highlight area of the first face image is 0.9, and the brightness value of pixel X2 in the face highlight area of the first face image is 0.8. By processing the current brightness value of each pixel in the face highlight area of the first face image using formula (1), the brightness value of pixel X1 may be decreased to 0.81, and the brightness value of pixel X2 may be decreased to 0.72.

It should be noted that, a brightness value of each pixel in an area other than the face highlight area in the second face image is still equal to a brightness value of a corresponding pixel in the area other than the face highlight area in the first face image.

It should be noted that, in the embodiment, in order to adjust the brightness value of the face highlight area in the first face image, a mask image of the face highlight area may be generated after determining and extracting the face highlight area from the first face image, the first face image is covered by the mask image of the face highlight area, and the brightness value of the first face image which is covered by the mask image of the face highlight area is adjusted. In this way, the brightness value of the face highlight area in the first face image can be adjusted.

In block 104, a third face image is obtained by converting a color format of the second face image into a RGB color format and decreasing an intensity of each color channel of each pixel in the second face image.

In the RGB color format, various colors can be obtained by changing three color channels which include a red color channel, a blue color channel and a green color channel and overlaying these three color channels. R, G and B represent the red color channel, the green color channel, the blue color channel, respectively.

In an embodiment, the intensity of each color channel of each pixel in the second face image which is in the RGB color format may be decreased by using formula (2) to obtain the third face image.

$$C'=A'*B'/255 \quad (2)$$

where A' represents an intensity of a certain color channel of a pixel in the second face image, B' represents an intensity of the certain color channel of a secondary color, and C' represents an intensity of the certain color channel of a corresponding pixel in the third face image. An intensity value of B' is within a range of 0-255.

For example, assume that the intensity of color channel R of pixel X1 in the second face image is 100, the intensity of color channel G of pixel X1 in the second face image is 200, the intensity of color channel B of pixel X1 in the second face image is 150, the intensity of color channel R of the secondary color is 102, the intensity of color channel G of the secondary color is 153, and the intensity of color channel B of the secondary color is 102. In the third face image acquired by decreasing the intensity of each color channel of each pixel in the second face image using the formula (2), the intensity of color channel R of pixel X1 is 100*102/255=40, the intensity of color channel G of pixel X1 is 200*153/255=120, and the intensity of color channel B of pixel X1 is 150*102/255=60.

In block 105, a target face image is obtained by blending the third face image and the first face image to be processed.

It should be understood that, the third face image is obtained by decreasing the brightness value of the face highlight area based on the predetermined highlight darkening parameter to obtain the second face image and converting the color format of the second face image to the RGB color format and further decreasing the intensity of each color channel of each pixel in the second face image. Compared with the first face image, facial features in the third face image may be rigid and less three-dimensional. In the embodiment, in order to avoid deficiencies of rigid and less three-dimensional facial features in the first face image after the beauty processing, the third face image and the first face image may be blended to obtain the target face image in which the face has natural and three-dimensional facial features.

In an embodiment, since the third face image is in the RGB color format and the first face image is in the Lab color format, in order to blend the third face image and the first face image, the color format of the first face image may be converted into the RGB color format, and the third face image and the first face image to be processed both in the RGB color format are blended to obtain the target face image.

In an embodiment, for pixels at the same position in the third face image and the first face image to be processed, weighted averaging is performed on the intensities of color channels R, G and B of the pixel in the first face image and intensities of color channels R, G and B of the pixel in the third face image, respectively. Weighted average values of the intensities of color channels R, G and B of a certain pixel in the third face image and the intensities of color channels R, G and B of a pixel in the first face image that is located at the same position as the certain pixel are determined as the intensities of color channels R, G and B of a corresponding pixel in the target face image, respectively, such that the target face image can be obtained.

For example, assume that the intensity of color channel R of pixel X1 in the third face image is R1, the intensity of color channel G of pixel X1 in the third face image is G1, the intensity of color channel B of pixel X1 in the third face image is B1, the intensity of color channel R of pixel X2 in the third face image is R2, the intensity of color channel G of pixel X2 in the third face image is G2, the intensity of color channel B of pixel X2 in the third face image is B2. Pixel X3 in the first face image can be considered to have the same position as pixel X1 in the third face image, and pixel X4 in the first face image can be considered to have the same position as pixel X2 in the third face image. Assume that the intensity of color channel R of pixel X3 in the first face image is R3, the intensity of color channel G of pixel X3 in the first face image is G3, the intensity of color channel B of pixel X3 in the first face image is B3, the intensity of color channel R of pixel X4 in the first face image is R4, the intensity of color channel G of pixel X4 in the first face image is G4, the intensity of color channel B of pixel X4 in the first face image is B4. Thus, in the target face image, the intensities of color channels R, G and B of a pixel that has the same position as pixel X1 in the third face image are (R1+R3)/2, (G1+G3)/2, (B1+B3)/2, respectively, and the intensities of color channels R, G and B of a pixel that has the same position as pixel X2 in the third face image are (R2+R4)/2, (G2+G4)/2, (B2+B4)/2, respectively.

It should be noted that, the above way to blend the third face image and the first face image is merely an example, and in practice, those skilled in the art may blend the second face image and the first face image in any way, which is not limited herein.

It should be understood that, if a user's skin is an oily skin type, and the user takes a picture with a flashlight enabled, then the acquired image is prone to have a highlight area in the face area. With the method for processing an image according to the embodiments of the disclosure, after acquiring the first face image, the face highlight area is extracted from the first face image. The brightness value of the face highlight area is decreased based on the predetermined highlight darkening parameter to obtain the second face image, the color format of the second face image is converted into the RGB color format and the intensity of each color channel of each pixel in the second face image is decreased to obtain the third face image, such that the third face image has the face highlight area darker in hue than the first face image. Since the face in the first face image goes through no processing, facial features of the face in the first face image are natural and three-dimensional. The target face image is obtained by blending the third face image and the first face image, such that the target face image may have natural and three-dimensional facial features. In this way, with the method for processing an image according to the disclosure, the target face image has the face highlight area darker in hue and has more natural and three-dimensional facial features compared to the first face image, such that a vaporific and matte effect with sense of high quality may be achieved. Since the vaporific and matte effect of the face image can be achieved automatically in real time without any manual adjustment, the time and effort of the user may be saved, and further no photo editing technique is required, such that mass requirements can be fulfilled, thus expanding the application range.

With the method for processing an image according to the embodiments of the disclosure, after acquiring the first face image which is in the Lab color format, the face highlight area is extracted from the first face image. The face highlight area is an area having a brightness value not lower than a first predetermined brightness threshold in a face area of the first face image. The brightness value of the face highlight area is decreased based on the predetermined highlight darkening parameter to obtain the second face image, the color format of the second face image is converted into the RGB color format and the intensity of each color channel of each pixel in the second face image is decreased to obtain the third face image. The third face image and the first face image are blended to obtain the target face image. In this way, a vaporific and matte effect of the face image may be achieved automatically in real time, which may save time and effort of the user and may be widely used.

Figure 2:
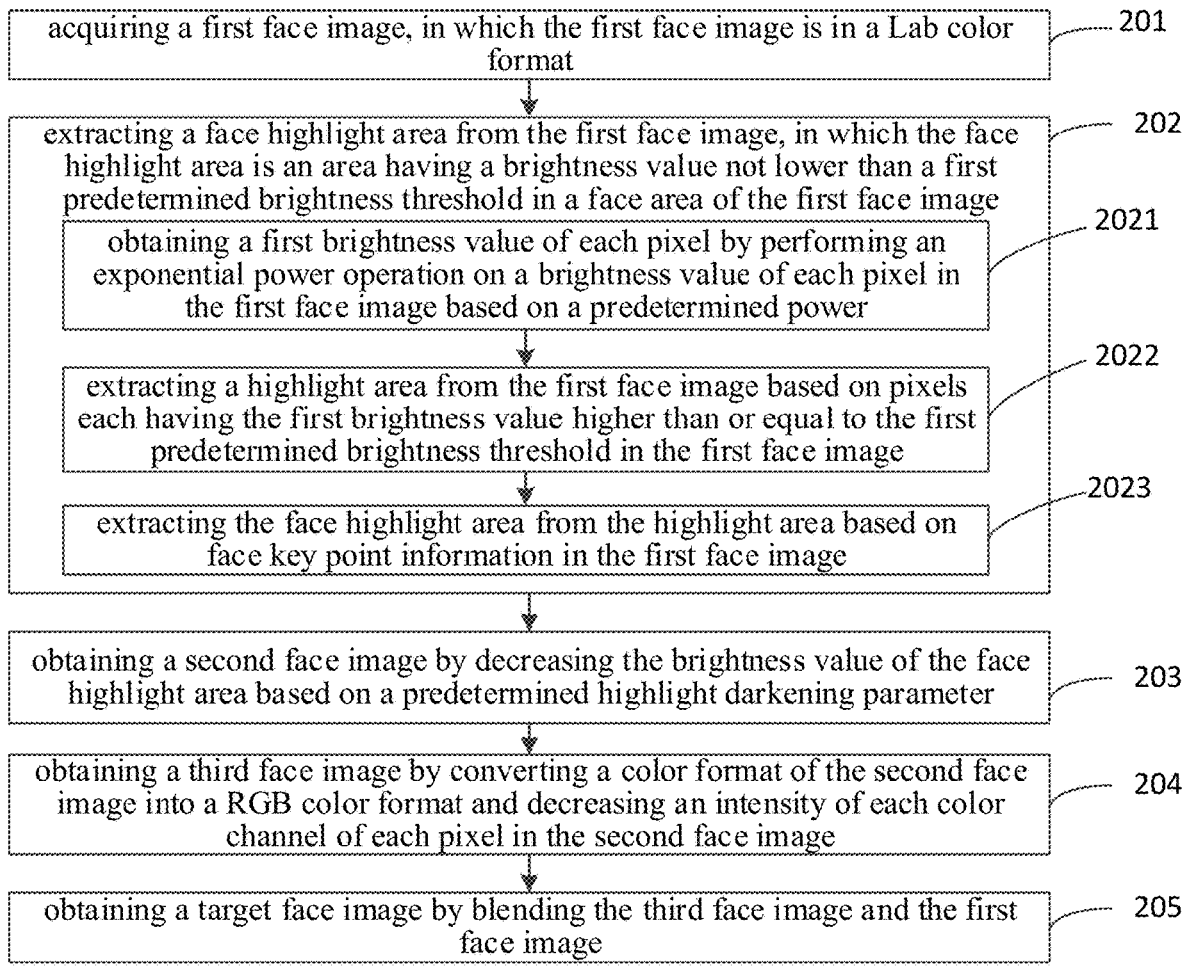
FIG. 2 is a flow chart illustrating a method for processing an image according to another embodiment.

It can be seen from the above description that, the area containing pixels each having the brightness value no less than the first predetermined brightness threshold may be determined as a highlight area in the first face image based on the normalized brightness value of each pixel in the first face image. However, in practice, when determining the highlight area in the first face image based on the normalized brightness value of each pixel in the first face image, the brightness value of the highlight area may have a small difference with that of a non-highlight area, such that it is difficult to extract the highlight area from the first face image accurately. In the embodiment, the brightness value of each pixel in the first face image may be further processed, to expand the difference in brightness value between the highlight area and the non-highlight area. By determining the highlight area in the first face image based on the processed brightness value of each pixel in the first face image, an accuracy of determining the highlight area in the first face image may be improved. With reference to FIG. 2, a way to extract the face highlight area from the first face image in the method for processing an image will be described below.

FIG. 2 is a flow chart illustrating a method for processing an image according to another embodiment.

As illustrated in FIG. 2, the method may include the following blocks 201-205, with regard to details of blocks 201-205, reference can be made to blocks 101-105 in the method for processing an image shown in FIG. 1, which are not elaborated here. Further the block 202 may include the following blocks 2021-2023.

In block 2021, an exponential power operation is performed on a brightness value of each pixel in the first face image based on a predetermined power to obtain a first brightness value of each pixel.

The predetermined power may be set according to requirements. For example, the predetermined power may be not lower than a predetermined power threshold. The predetermined power threshold for example may be 2.

In an embodiment, the exponential power operation may be performed on the brightness value of each pixel in the first face image based on the predetermined power by using formula (3) to obtain the first brightness value of each pixel.

$$A = L^a \quad (3)$$

where A presents a processed face image with the brightness value of each pixel subject to the exponential power operation, L represents a brightness value of any pixel in the first face image, a represents the predetermined power.

In detail, by performing the exponential power operation on the brightness value of each pixel in the first face image based on the predetermined power using formula (3), each pixel in the whole first face image takes a as the exponent to complete the exponential power operation, such that the first brightness value which is subject to the exponential power operation of each pixel may be obtained.

For example, assume that the predetermined power a is 2, the brightness value of pixel X1 in the first face image is 0.9, and the brightness value of pixel X2 in the first face image is 0.8. After performing the exponential power operation on the brightness value of each pixel in the first face image using formula (3), in the resulting whole first face image A, the first brightness value of pixel X1 is a square of 0.9, i.e, 0.81, and the first brightness value of pixel X2 is a square of 0.8, i.e., 0.64.

In block 2022, a highlight area is extracted from the first face image based on pixels each having the first brightness value higher than or equal to the first predetermined brightness threshold in the first face image.

In block 2023, the face highlight area is extracted from the highlight area based on face key point information in the first face image.

In an embodiment, the area containing the pixels each of which has the first brightness value higher than or equal to the first predetermined brightness threshold in the first face image may be determined as the highlight area in the first face image. Further, the face highlight area may be extracted from the highlight area based on the face key point information in the first face image to obtain the face highlight area in the first face image.

In the embodiment, by performing the exponential power operation on the brightness value of each pixel in the first face image based on the predetermined power to obtain the first brightness value of each pixel, the higher brightness value may be reduced slightly while the lower brightness value may be reduced substantially, such that the difference between the brightness value of the highlight area and that of the non-highlight area may be expanded, and the highlight area and the non-highlight area may have a sharp boundary. The highlight area in the first face image may be determined more accurately by using the first brightness value of each pixel in the first face image and the first predetermined brightness threshold.

Figure 3:
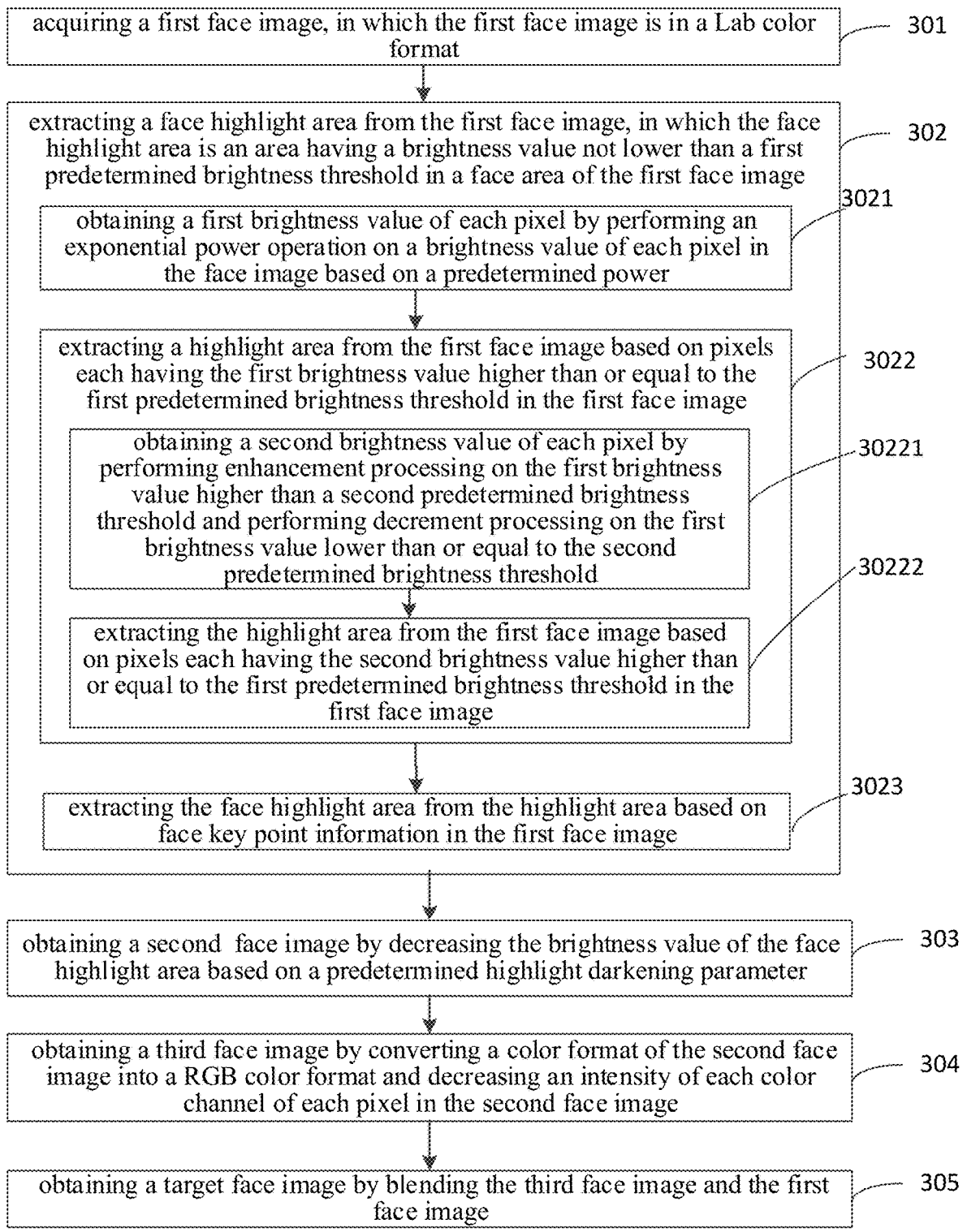
FIG. 3 is a flow chart illustrating a method for processing an image according to another embodiment.

In an embodiment, in order to determine the highlight area in the first face image more accurately, the first brightness value of each pixel may be further processed, to further expand the difference between the brightness value of the highlight area and that of the non-highlight area and to make the boundary between the highlight area and the non-highlight area more obvious. With reference to FIG. 3, a way to extract the highlight area from the first face image in the method for processing an image according to the embodiment of the disclosure will be further described below.

FIG. 3 is a flow chart illustrating a method for processing an image according to another embodiment.

As illustrated in FIG. 3, the method may include blocks 301-305, with regard to details of blocks 301-305, reference can be made to blocks 101-105 in the method for processing an image shown in FIG. 1, which are not elaborated here. The block 302 includes blocks 3021-3023, details of which may refer to blocks 2021-2023 in the method for processing an image shown in FIG. 2. Further the block 3022 may include the following blocks 30221-30222.

In block 30221, enhancement processing is performed on the first brightness value higher than a second predetermined brightness threshold and decrement processing is performed on the first brightness value lower than or equal to the second predetermined brightness threshold, to obtain a second brightness value of each pixel.

The second predetermined brightness threshold is a critical value for the enhancement processing or the decrement processing of the first brightness value, which may be set according to requirements.

In an embodiment, a high-contrast enhancement algorithm shown in formula (4) may be used to process the first brightness value of each pixel in the first face image to realize the enhancement processing on the first brightness value higher than the second predetermined brightness threshold and the decrement processing on the first brightness value lower than or equal to the second predetermined brightness threshold, such that the second brightness value of each pixel can be obtained. As an example, the second predetermined brightness threshold is set to 0.5 in formula (4).

$$\begin{cases} l' = 1.0 - 2*(1.0-l)*(1.0-l), & \text{if } l > 0.5 \\ l' = 2*l*l, & \text{if } l < 0.5 \end{cases} \quad (4)$$

where l represents the first brightness value of a certain pixel in the first face image, l' represents the second brightness value of the certain pixel obtained by processing the first brightness value of the certain pixel.

In detail, by processing the first brightness value of each pixel in the first face image A using formula (4), the second brightness value of the pixel may be obtained. For a pixel having the first brightness value greater than the second predetermined brightness threshold 0.5 in the first face image A, the above formula (4) may be used to perform the enhancement processing on the first brightness value to obtain the second brightness value of the pixel. For a pixel having the first brightness value smaller than the second predetermined brightness threshold 0.5 in the first face image A, the above formula (4) may be used to perform the decrement processing on the first brightness value to obtain the second brightness value of the pixel.

For example, assume that the first brightness value of pixel X1 in the first face image A is 0.81, the first brightness value of pixel X2 in the first face image A is 0.64, and the first brightness value of pixel X3 in the first face image A is 0.2. After processing the first brightness value of each pixel in the first face image A using formula (4), the second brightness value of pixel X1 which is obtained after the enhancement processing may be 1−2*(1.0−0.81)*(1.0−0.81), i.e., 0.9278, the second brightness value of pixel X2 which is obtained after the enhancement processing may be 1−2*(1.0−0.64)*(1.0−0.64), i.e., 0.7408, the second brightness value of pixel X3 which is obtained after the decrement processing may be 2*0.2*0.2, i.e., 0.08.

In block 30222, the highlight area is extracted from the first face image based on pixels each having the second brightness value higher than or equal to the first predetermined brightness threshold in the first face image.

In an embodiment, the area containing pixels each of which has the second brightness value higher than or equal to the first predetermined brightness threshold in the first face image may be determined as the highlight area in the first face image. Further, the face highlight area may be extracted from the highlight area based on the face key point information in the first face image to obtain the face highlight area in the first face image.

In the embodiment, by performing the exponential power operation on the brightness value of each pixel in the first face image based on the predetermined power to obtain the first brightness value of each pixel, the higher brightness value may be reduced slightly while the lower brightness value may be reduced substantially, such that the difference between the brightness value of the highlight area and that of the non-highlight area may be expanded, and the highlight area and the non-highlight area may have a sharp boundary. By performing the enhancement processing on the first brightness value higher than the second predetermined brightness threshold and performing the decrement processing on the first brightness value lower than or equal to the second predetermined brightness threshold to obtain the second brightness value of each pixel, the higher first brightness value may be further increased while the lower first brightness value may be further reduced, such that the difference between the brightness value of the highlight area and that of the non-highlight area may be further expanded, and the sharp boundary between the highlight area and the non-highlight area may become more obvious. Thus, the highlight area in the first face image may be determined more accurately by using the second brightness value of each pixel in the f first ace image and the first predetermined brightness threshold.

Figure 4:
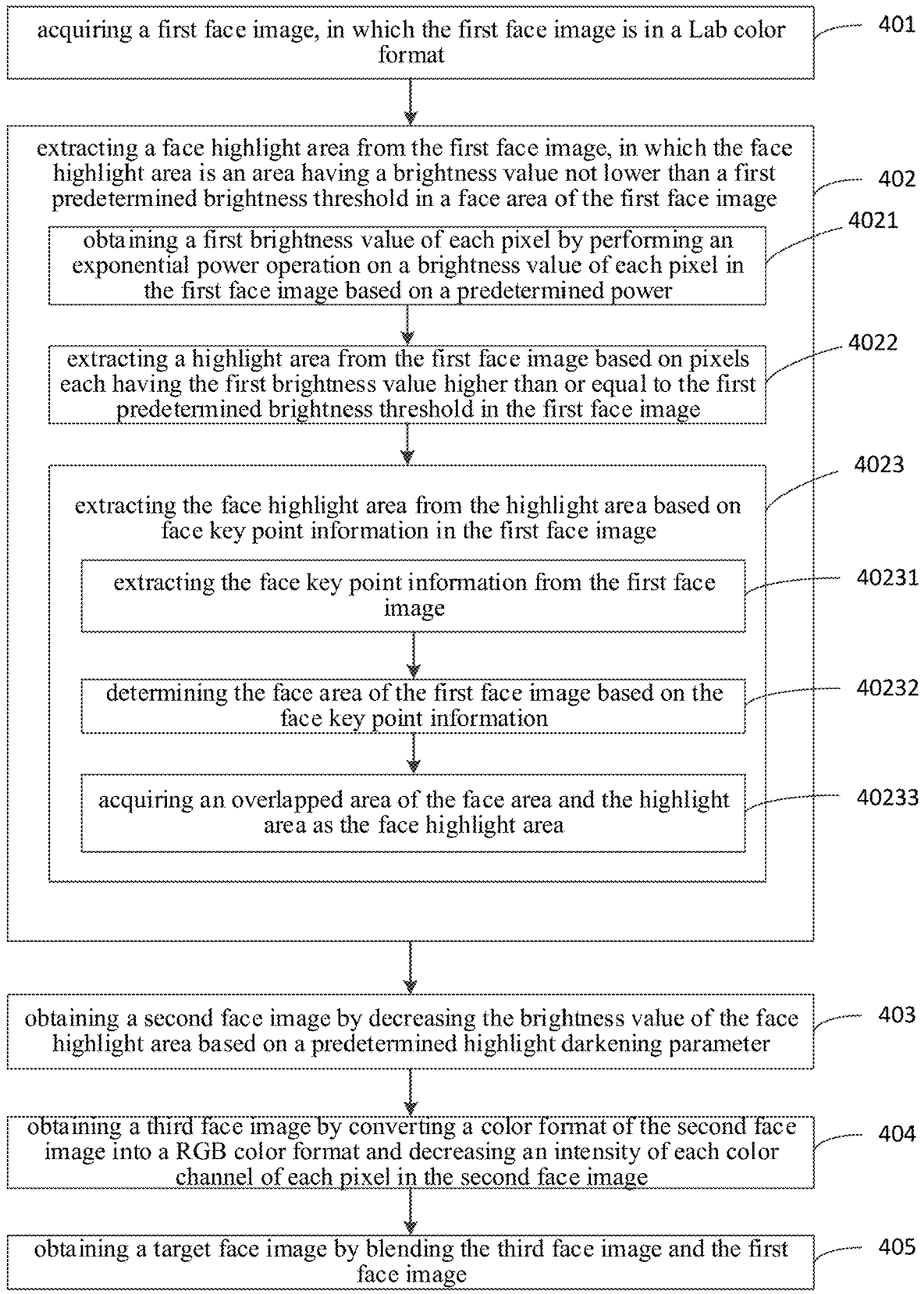
FIG. 4 is a flow chart illustrating a method for processing an image according to another embodiment.

It can be seen from the above description that, in the embodiment of the disclosure, the highlight area in the first face image is extracted firstly and the face highlight area is extracted from the highlight area based on the face key point information in the first face image to extract the face highlight area from the first face image. With reference to FIG. 4, in the embodiment, a way to extract the face highlight area from the highlight area based on the face key point information in the first face image will be further described below.

FIG. 4 is a flow chart illustrating a method for processing an image according to another embodiment.

As illustrated in FIG. 4, the method may include the following blocks 401-405, with regard to details of blocks 401-405, reference can be made to blocks 101-105 in the method for processing an image shown in FIG. 1, which are not elaborated here. The block 402 includes blocks 4021-4023, details of which may refer to blocks 2021-2023 in the method for processing an image shown in FIG. 2. Further, the block 4023 may include the following blocks 40231-40233.

In block 40231, face key point information is extracted from the first face image.

A face key point may be a feature point at any position on a face, for example, a feature point of facial features such as eyes, mouth, noses, etc., a feature point on a face contour, and so on. The face key point information may include a position of the face key point in the first face image and the number of face key points, etc.

In an embodiment, the face key point information may be extracted from the first face image in various ways.

For example, a face key point detection model may be trained by a deep learning method in advance. The first face image is inputted into the pre-trained face key point detection model to extract the face key point information from the first face image. The face key point detection model may be any deep neural network model, for example a convolution neural network model, a recursive neural network model etc., or may be another type of data processing model, which is not limited herein.

Alternatively, the face key point information may be extracted from the first face image by using any other face key point detecting method in the related art, which is not limited herein.

In block 40232, a face area in the first face image is determined based on the face key point information.

The face area refers to an area containing a face in the first face image.

In an embodiment, after extracting the face key point information from the first face image, a position of the face contour in the first face image may be determined based on the face key point information, and an area surrounded by the face contour may be determined as the face area in the first face image.

It should be noted that, in addition to the above way to determine the face area in the first face image based on the face key point information, in the embodiment, the face area in the first face image may be determined in other ways.

For example, a harr feature detection algorithm may be used to recognize whether a face exists in the first face image, if yes, a feature extraction is performed on the first face image to obtain a face feature value, and the face feature value is inputted into the adaboost algorithm to recognize the face area in the first face image. Alternatively, a color range of a face skin may be determined in advance, and an area containing pixels each having a color value within the color range in the first face image is determined as the face area. A specific way to determine the face area in the first face image is not limited herein.

It should be understood that, when the area surrounded by the face contour in the first face image is determined as the face area in the first face image, and further the face highlight area is determined, and the brightness value of the face highlight area is decreased based on the predetermined highlight darkening parameter, the brightness value of an area (i.e., facial feature area) containing facial features in the face area may be decreased, such that the facial features may have dim color, which may affect the beauty effect. In a possible implementation of the embodiment, when determining the face area in the first face image, the area surrounded by the face contour excluding the facial feature area may be determined as the face area, such that the facial feature area may be protected. When the brightness value of the face area is decreased, the brightness value of the facial feature area may be not decreased, such that the facial feature area may be displayed normally.

In an embodiment, when determining the area surrounded by the face contour excluding the facial feature area as the face area, the area containing the facial features may be determined based on the face key point information after extracting the face key point information from the first face image, the area surrounded by the face contour is determined based on the face key point information, and an area other than the area containing the facial features in the area surrounded by the face contour may be determined as the face area.

In block 40233, an overlapped area of the face area and the highlight area is acquired as the face highlight area.

In an embodiment, after determining the face area and the highlight area in the first face image, a mask image of the face area and a mask image of the highlight area can be obtained, respectively. In the mask image of the face area, the face area is set to 1 and the non-face area (the area other than the face area) is set to 0. In the mask image of the highlight area, the highlight area is set to 1, and the non-highlight area (the area other than the highlight area) is set to 0. The two mask images are multiplied, and the area with value 1 is considered as the overlapped area, which is the face highlight area in the embodiment.

Alternatively, the overlapped area of the face area and the highlight area may be acquired in any other way in the related art, which is not limited herein.

In the above way, the face highlight area in the first face image may be determined, and a mask image of the face highlight area may be generated. The first face image is covered by the mask image of the face highlight area, and the brightness value of the first face image covered by the mask image of the face highlight area is adjusted based on the predetermined highlight darkening parameter, such that decreasing of the brightness value of the face highlight area in the first face image may be achieved.

It should be understood that, in the first face image, there may be deficiencies on the face, such as a pockmark, a region with dim skin color on the face. In the embodiment, after determining the face area of the first face image, preliminary beauty processing is performed on the face area, and the face highlight area is obtained based on the highlight area and the face area after the preliminary beauty processing, and further the brightness value of the face highlight area is decreased. In this way, the beauty effect of the first face image can be improved.

After block 40232, the method may further include a step of performing preliminary beauty processing on the face area. The preliminary beauty processing includes at least one of homogenizing skin color, buffing skin, eliminating dark circles, eliminating nasolabial folds, and brightening teeth.

Buffing skin may include basic skin buffing and further skin buffing with sense of high quality.

In an embodiment, after determining the face area in the first face image, a mask image of the face area may be generated, the first face image is covered by the mask image of the face area, and the preliminary beauty processing is performed on the first face image to realize the preliminary beauty processing of the face area in the first face image.

Figure 5:
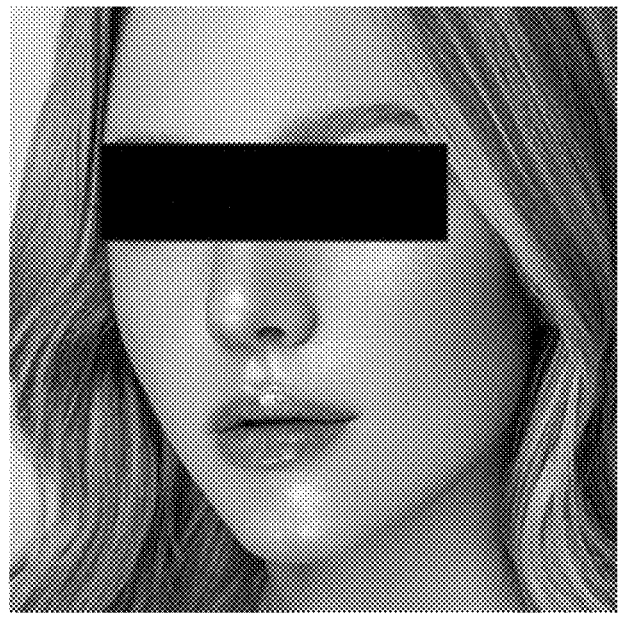
FIG. 5 is a schematic diagram illustrating a face image to be processed according to an embodiment.
Figure 6:
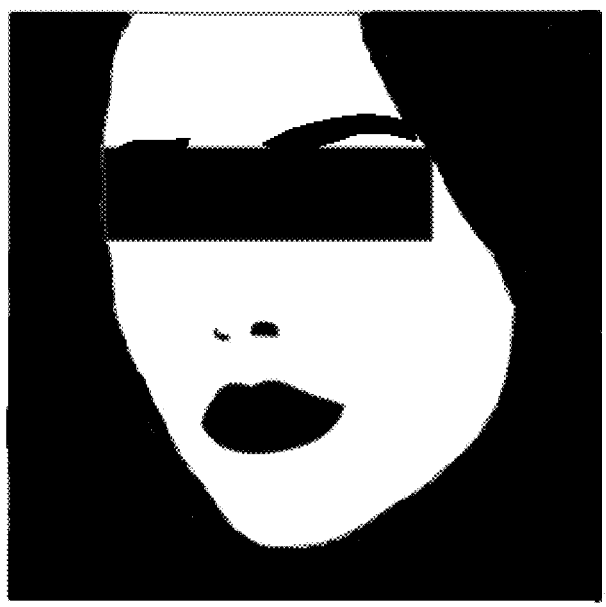
FIG. 6 is a schematic diagram illustrating a mask image of a face area in a face image according to an embodiment.

For example, assume that FIG. 5 shows a first face image. After extracting the face key point information from the first face image and determining the face area in the first face image based on the face key point information, the mask image of the first face image shown in FIG. 6 may be generated. The first face image may be covered by the mask image of the face area, and the preliminary beauty processing is performed on the first face image, such that the preliminary beauty processing of the face area in the first face image is realized.

In an embodiment, for example, the processing of homogenizing skin color, eliminating dark circles, eliminating nasolabial folds of the face area may be realized by adjusting pixel values or the like. Basic skin buffing of the face area may be realized by denoising, sharping contour or the like. Further skin buffing of the face area may be realized by adding textures during the skin buffing. The processing of brightening teeth may be realized by adjusting brightness values of the pixels. Regarding a specific implementation, reference may be made to description in the related art, which is not elaborated herein.

It should be noted that, in an embodiment, only one of the preliminary beauty processing, for example, buffing skin may be performed on the face area. Or some of the preliminary beauty processing, for example, homogenizing skin color, buffing skin, eliminating dark circles may be performed on the face area, which is not limited herein.

It should be noted that, if the preliminary beauty processing such as homogenizing skin color, buffing skin, is performed on the face area after the brightness value of the face highlight area is decreased based on the predetermined highlight darkening parameter, the vaporific and matte effect of the first face image may be affected. Thus, when the preliminary beauty processing is performed on the face area, homogenizing skin color, buffing skin, and so on may be performed on the face area, and the face highlight area is obtained based on the highlight area and the face area after the preliminary beauty processing, then the brightness value of the face highlight area is decreased, so as to prevent the preliminary beauty processing such as homogenizing skin color, buffing skin from affecting the vaporific and matte effect of the face area in the target face image.

By performing the preliminary beauty processing on the face area after the face area in the first face image is determined, and determining the face highlight area based on the highlight area and the face area after the preliminary beauty processing, and further decreasing the brightness value of the face highlight area, the beauty effect of the first face image may be further improved.

Figure 7:
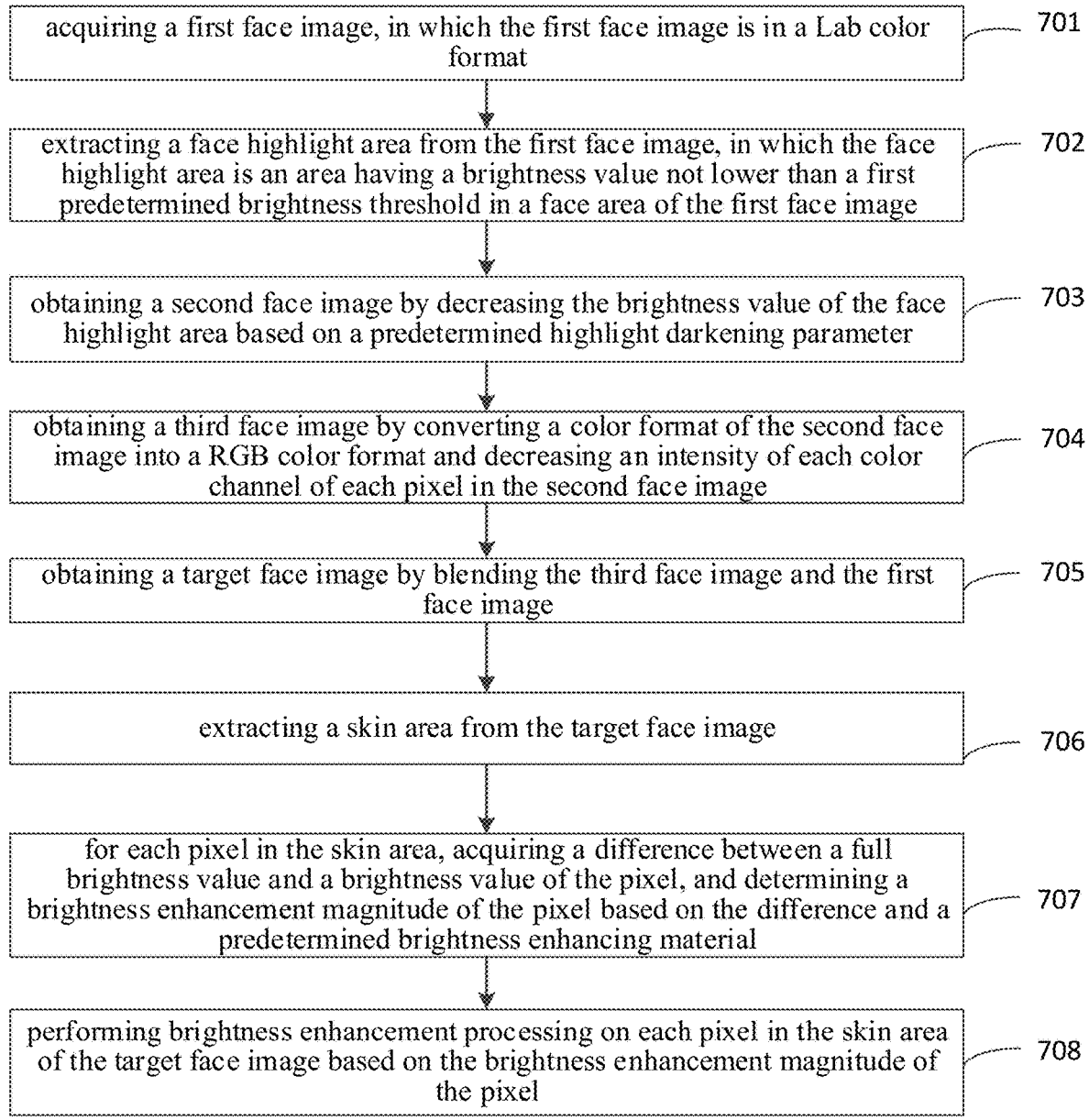
FIG. 7 is a flow chart illustrating a method for processing an image according to another embodiment.

It should be understood that, in a possible implementation, a brightness value of a skin area in the target face image may be low due to the decreasing of the brightness value of the face highlight area and the decrement processing on the intensity of each color channel of each pixel. In order to further improve the beauty effect of the first face image, in an embodiment, brightness enhancement processing may be performed on the skin area in the target face image. With reference to FIG. 7, in an embodiment, a way to perform the brightness enhancement processing on the skin area in the target face image will be further described below.

FIG. 7 is a flow chart illustrating a method for processing an image according to another embodiment.

As illustrated in FIG. 7, the method may include blocks 701-708.

With regard to details of the blocks 701-705, reference may be made to the above the blocks 101-105 in the method for processing an image shown in FIG. 1, which are not elaborated here.

In block 706, a skin area is extracted from the target face image.

The skin area refers to an area containing skin in the target face image.

In an embodiment, value ranges of three basic colors corresponding to the skin may be determined in advance. The area containing pixels each having color values of the three basic colors within the value ranges in the target face image may be determined as the skin area. Further, the skin area may be extracted from the target face image.

In block 707, for each pixel in the skin area, a difference between a full brightness value and a brightness value of the pixel is acquired and a brightness enhancement magnitude of the pixel is determined based on the difference and a predetermined brightness enhancing material.

In block 708, brightness enhancement processing is performed on each pixel in the skin area of the target face image based on the brightness enhancement magnitude of the pixel.

The brightness enhancing material may include material which may enhance the brightness value of the pixel, such as brightness conversion, filter and so on. In an embodiment, the brightness enhancing material may be stored in the electronic device, or may be obtained on line, which is not limited herein.

In an embodiment, blocks 707 and 708 may be implemented by formula (5).

$$I_{upd} = I_1 + (1.0 - B_1) * L_1 \qquad (5)$$

where $I_{upd}$ represents a pixel value of a pixel after the brightness enhancement processing in the skin area of the target face image, $I_1$ represents a current pixel value of the pixel in the skin area of the target face image, $B_1$ represents a brightness value of the pixel in the skin area of the target face image, $L_1$ represents the brightness enhancing material used to enhance the brightness value of each pixel in the skin area, 1.0 represents the full brightness value.

It should be understood that, by processing the skin area in the target face image using formula (5), if the brightness value of the pixel in the skin area is high, then the difference between the full brightness value and the brightness value of the pixel, i.e., 1.0−B, is small, then a small brightness enhancement magnitude may be determined based on the difference and the predetermined brightness enhancing material, such that a slight brightness enhancement may be performed on the pixel in the skin area of the target face image. If the brightness value of the pixel in the skin area is low, then the difference between the full brightness value and the brightness value of the pixel, i.e., 1.0−B, is big, then a big brightness enhancement magnitude may be determined based on the difference and the predetermined brightness enhancing material, such that a great brightness enhancement may be performed on the pixel in the skin area of the target face image. In this way, for the pixels having different brightness values in the skin area of the target face image, since the brightness values of the pixels have different differences with the full brightness value, different levels of brightness enhancements may be performed on the pixels having different brightness values in the skin area of the target face image based on the current pixel value and the predetermined brightness enhancing material, and then the face image after the brightness enhancement processing is obtained.

Since the brightness value of the pixel in the highlight area is high, and the brightness value of the pixel in the non-highlight area is low, in the embodiment, the slight brightness enhancement may be performed on the highlight area while the great brightness enhancement may be performed on the non-highlight area, such that it is avoided that the highlight appears in the highlight area while enhancing the brightness of the skin area.

It should be noted that, when the brightness enhancement processing is performed on each pixel of the skin area, a level of enhancement may be set according to requirements. In the embodiment, in order to avoid the brightness enhancement of each pixel in the skin area is too great to affect the vaporific and matte effect of the target face image, a slight brightness enhancement is set to be performed on each pixel in the skin area, such that the vaporific and matte effect of the target face image may be ensured while performing the brightness enhancement processing.

With the method for processing an image according to the embodiment of the disclosure, by extracting the skin area from the target face image, acquiring the difference between the full brightness value and the brightness value for each pixel in the skin area, determining the brightness enhancement magnitude of the pixel based on the difference and the predetermined brightness enhancing material and further performing the brightness enhancement processing on each pixel in the target face image based on the brightness enhancement magnitude of the pixel, the skin color in the skin area of the target face image may be brightened, thus further improving the beauty effect of the image.

In order to achieve the above embodiments, the embodiment of the disclosure presents an apparatus for processing an image.

Figure 8:
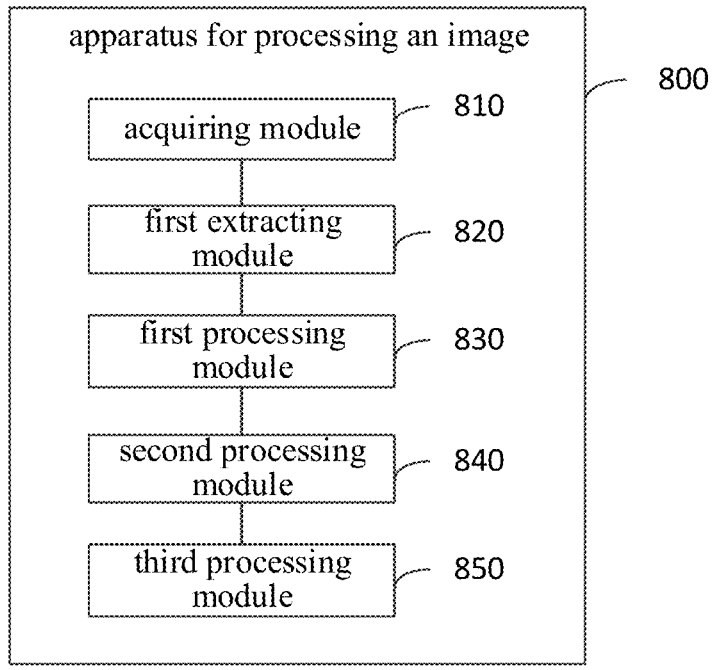
FIG. 8 is a block diagram illustrating an apparatus for processing an image according to an embodiment.

FIG. 8 is a block diagram illustrating an apparatus for processing an image according to an embodiment.

With reference to FIG. 8, the apparatus 800 for processing an image may include an acquiring module 810, a first extracting module 820, a first processing module 830, a second processing module 840, and a third processing module 850.

The acquiring module 810 is configured to acquire a first face image, in which the first face image is in a Lab color format.

The first extracting module 820 is configured to extract a face highlight area from the first face image, in which the face highlight area is an area having a brightness value not lower than a first predetermined brightness threshold in a face area of the first face image.

The first processing module 830 is configured to obtain a second face image by decreasing the brightness value of the face highlight area based on a predetermined highlight darkening parameter.

The second processing module 840 is configured to obtain a third face image by converting a color format of the first face image into a RGB color format and decreasing an intensity of each color channel of each pixel in the first face image.

The third processing module 850 is configured to obtain a target face image by blending the third face image and the first face image.

In detail, the apparatus for processing an image according to the embodiment may execute the method for processing an image according to any foregoing embodiment. The apparatus for processing an image may be configured in the electronic device to implement automatic processing of the first face image, which may save time and effort of the user and expand the application range.

The electronic device may be a static or movable computing device having an image processing function, for example, a movable computer device such as a notebook computer, a smart phone, a wearable device, or a static computing device such as a desktop computer, or another type of computing device. The apparatus for processing an image may be an application installed in the electronic device, or a software management tool of software products, which is not limited herein.

It should be noted that, with regard to the apparatus in the above foregoing embodiment, a specific way of performing operations by each module has been described in the method embodiments in detail, which are not described here.

With the apparatus for processing an image according to the embodiments of the disclosure, after acquiring the first face image which is in the Lab color format, the face highlight area may be extracted from the first face image. The face highlight area is an area having the brightness value not lower than the first predetermined brightness threshold in the face area of the first face image. The brightness value of the face highlight area is decreased based on the predetermined highlight darkening parameter to obtain the second face image, the color format of the second face image is converted into the RGB color format and the intensity of each color channel of each pixel in the second face image is decreased to obtain the third face image. The third face image and the first face image are blended to obtain the target face image. In this way, a vaporific and matte effect of the face image may be achieved automatically in real time, which may save time and effort of the user and may be widely used.

Figure 9:
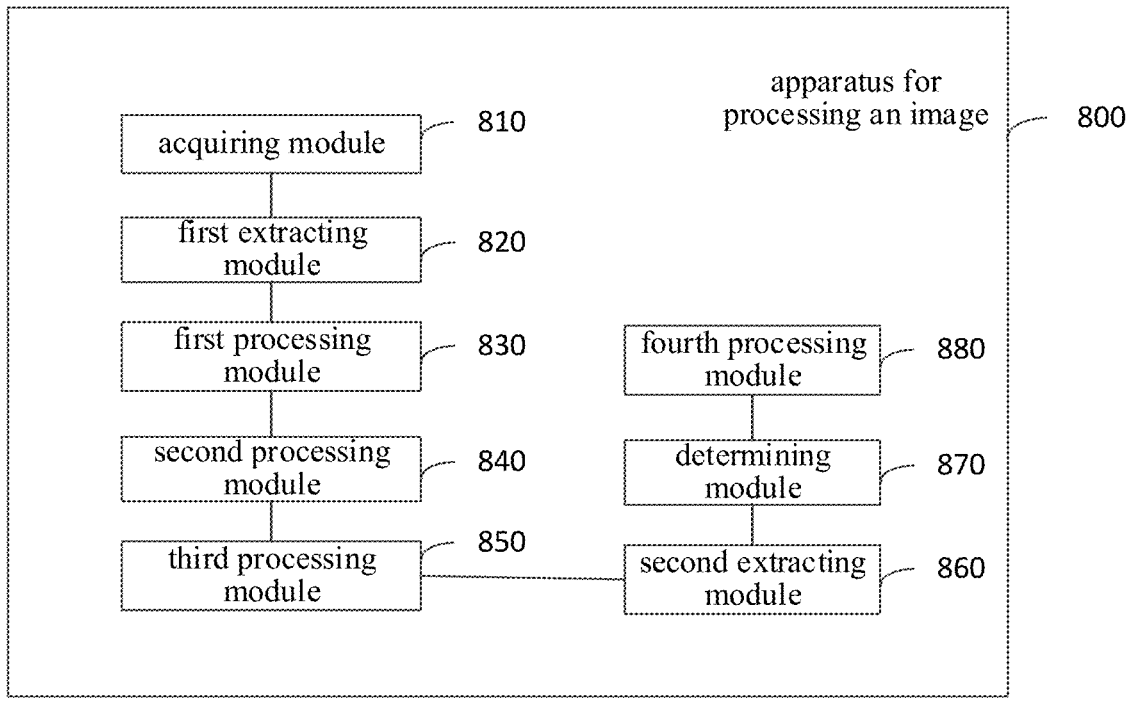
FIG. 9 is a block diagram illustrating an apparatus for processing an image according to another embodiment.

FIG. 9 is a block diagram illustrating an apparatus for processing an image according to an embodiment. With reference to FIG. 9, based on the embodiment of FIG. 8, the apparatus for processing an image may further include a second extracting module 860, a determining module 870 and a fourth processing module 880.

The second extracting module 860 is configured to extract a skin area from the target face image.

The determining module 870 is configured to, for each pixel in the skin area, acquire a difference between a full brightness value and a brightness value of the pixel, and to determine a brightness enhancement magnitude of the pixel based on the difference and a predetermined brightness enhancing material.

The fourth processing module 880 is configured to perform brightness enhancement processing on each pixel in the skin area of the target face image based on the brightness enhancement magnitude of the pixel.

In an embodiment, the first extracting module 820 includes a processing unit, a first extracting unit and a second extracting unit.

The processing unit is configured to obtain a first brightness value of each pixel by performing an exponential power operation on a brightness value of each pixel in the first face image based on a predetermined power.

The first extracting unit is configured to extract a highlight area from the first face image based on pixels each having the first brightness value higher than or equal to the first predetermined brightness threshold in the first face image.

The second extracting unit is configured to extract the face highlight area from the highlight area based on face key point information in the first face image.

In an embodiment, the first extracting unit is further configured to: obtain a second brightness value of each pixel by performing enhancement processing on the first brightness value higher than a second predetermined brightness threshold and performing decrement processing on the first brightness value lower than or equal to the second predetermined brightness threshold; and extract the highlight area from the first face image based on pixels each having the second brightness value higher than or equal to the first predetermined brightness threshold in the first face image.

In an embodiment, the second extracting unit is further configured to: extract face key point information from the first face image; determine the face area of the first face image based on the face key point information; and acquire an overlapped area of the face area and the highlight area as the face highlight area.

In an embodiment, the second extracting unit is further configured to: perform preliminary beauty processing on the face area, wherein the preliminary beauty processing comprises at least one of homogenizing skin color, buffing skin, eliminating dark circles, eliminating nasolabial folds, and brightening teeth.

It should be noted that, with regard to the apparatus in the above foregoing embodiment, a specific way of performing operations by each module has been described in the method embodiments in detail, which are not described here.

With the apparatus for processing an image according to the embodiments of the disclosure, after acquiring the first face image which is in the Lab color format, the face highlight area may be extracted from the first face image. The face highlight area is an area having the brightness value not lower than the first predetermined brightness threshold in the face area of the first face image. The brightness value of the face highlight area is decreased based on the predetermined highlight darkening parameter to obtain the second face image, the color format of the second face image is converted into the RGB color format and the intensity of each color channel of each pixel in the second face image is decreased to obtain the third face image. The third face image and the first face image are blended to obtain the target face image. In this way, a vaporific and matte effect of the face image may be achieved automatically in real time, which may save time and effort of the user and may be widely used.

Figure 10:
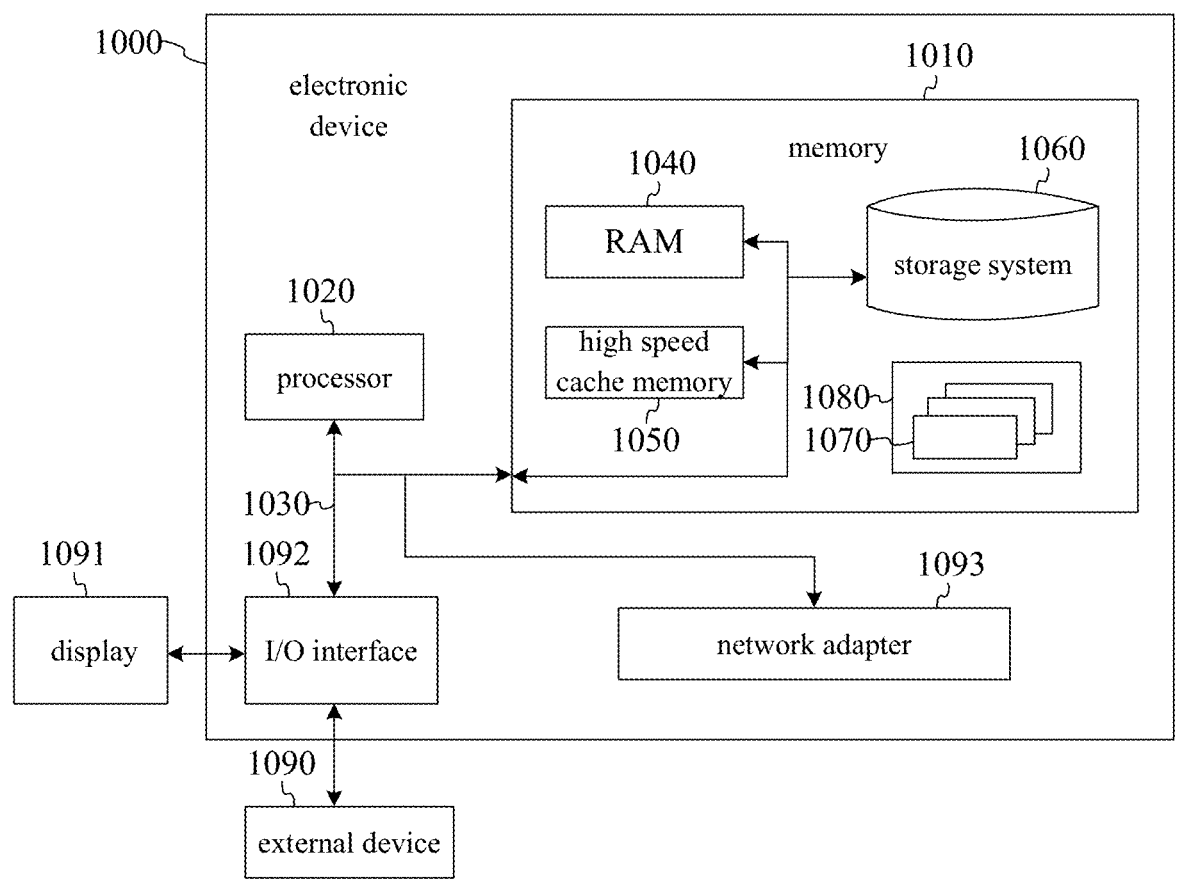
FIG. 10 is a block diagram illustrating an electronic device for processing an image according to an embodiment.

FIG. 10 is a block diagram illustrating an electronic device 1000 for processing an image according to an embodiment of the present disclosure.

As illustrated in FIG. 10, the electronic device 1000 includes a processor 1020 and a memory 1010 configured for storing instructions executable by the processor 1020. The processor 1020 is configured to execute the instructions to implement the method for processing an image according to the embodiment of the disclosure.

In a possible implementation, the electronic device may include a bus 1030 connecting various components including the memory 1010 and the processor 1020.

The bus 1030 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The electronic device 1000 typically includes a variety of electronic device readable media. These media may be any available media accessible by the electronic device 1000 and includes both volatile and non-volatile media, removable and non-removable media.

The memory 1010 may include a computer system readable medium in the form of volatile memory, such as a random access memory (hereinafter referred to as RAM) 1040 and/or a high speed cache memory 1050. The electronic device 1000 may further include other removable or non-removable, volatile or non-volatile computer system storage media. By way of example only, the storage system 1060 may be configured to read and write a non-removable and non-volatile magnetic media (not illustrated in FIG. 10, commonly referred to as a "hard drive"). Although not illustrated in FIG. 10, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 1030 via one or more data medium interfaces. The memory 1010 may include at least one program product. The program product has a set (such as, at least one) of program modules configured to perform the functions of various embodiments of the present disclosure.

A program/utility 1080 having a set (at least one) of the program modules 1070 may be stored in, for example, the memory 1010. The program modules 1070 include but are not limited to, an operating system, one or more application programs, other programs modules, and program data. Each of these examples, or some combination thereof, may include an implementation of a network environment. The program modules 1070 generally perform the functions and/or methods in the embodiments described herein.

The electronic device 1000 may also communicate with one or more external devices 1090 (such as, a keyboard, a pointing device, a display 1091, etc.). Furthermore, the electronic device 1000 may also communicate with one or more communication devices enabling a user to interact with the electronic device 1000 and/or other devices (such as a network card, modem, etc.) enabling the electronic device 1000 to communicate with one or more devices. This communication can be performed via the input/output (I/O) interface 1092. Also, the electronic device 1000 may communicate with one or more networks (such as a local area network (hereafter referred to as LAN), a wide area network (hereafter referred to as WAN) and/or a public network such as an Internet) through a network adapter 1093. As illustrated in FIG. 10, the network adapter 1093 communicates with other modules of the electronic device 1000 over the bus 1030. It should be understood that, although not shown in FIG. 10, other hardware and/or software modules may be used in connection with the electronic device 1000. The hardware and/or software includes, but is not limited to, microcode, device drivers, redundant processing units, external disk drive arrays, RAID systems, tap Drive and data backup storage system.

The processor 1020 is configured to execute various functional applications and data processing by running programs stored in the memory 1010.

It should be noted that, regarding the implementation and principle of the electronic device according to the embodiment, reference can be made to the description of the method for processing an image according to the foregoing embodiment, which is not elaborated herein.

With the electronic device according to the embodiment of the disclosure, the face image to be processed may be processed automatically in real time to realize a vaporific and matte effect of the face image, which may save time and effort of the user and may be widely used.

In an embodiment, a computer readable storage medium including computer instructions is provided, for example, a memory including instructions. The instructions can be executed by a processor of an electronic device to perform the above method. Alternatively, the storage medium may be a non-transitory computer-readable media such as read-only memory (ROM), random-access memory (RAM), CD-ROMs, magnetic tapes, floppy disks, and optical data storage devices.

In an embodiment, a computer program product including computer programs is provided. When the computer programs/instructions in the computer program product are executed by a processor, the processor is caused to perform the method for processing an image according to the foregoing embodiments.

Those skilled in the art may easily conceive of other embodiments of the disclosure by considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the disclosure is limited only by the appended claims.

What is claimed is:

1. A method for image processing, comprising:
  acquiring a first face image, wherein the first face image is in a Lab color format;
  extracting a face highlight area from the first face image based on a brightness value of each pixel and face key point information in the first face image, wherein the face highlight area is an area having a brightness value not lower than a first predetermined brightness threshold in a face area of the first face image;
  obtaining a second face image by decreasing the brightness value of the face highlight area based on a predetermined highlight darkening parameter;
  obtaining a third face image by converting a color format of the second face image into a RGB color format and decreasing an intensity of each color channel of each pixel in the second face image;
  acquiring a fourth face image by converting a color format of the first face image into the RGB color format; and
  obtaining a target face image by blending the third face image and the fourth face image.

2. The method of claim 1, said extracting a face highlight area from the first face image comprising:
  obtaining a first brightness value of each pixel by performing an exponential power operation on the brightness value of each pixel in the first face image based on a predetermined power; and
  extracting the face highlight area from the first face image based on the first brightness value of each pixel, the first predetermined brightness threshold and the face key point information in the first face image.

3. The method of claim 2, said extracting the face highlight area from the first face image based on the first brightness value of each pixel, the first predetermined brightness threshold and face key point information in the first face image comprising:
  extracting a highlight area from the first face image based on the first brightness value of each pixel and the first predetermined brightness threshold; and
  extracting the face highlight area from the highlight area based on the face key point information in the first face image.

4. The method of claim 3, said extracting a highlight area from the first face image based on the first brightness value of each pixel and the first predetermined brightness threshold comprising:
  obtaining a second brightness value of each pixel by performing enhancement processing on the first brightness value higher than a second predetermined brightness threshold and performing decrement processing on the first brightness value lower than or equal to the second predetermined brightness threshold; and
  extracting the highlight area from the first face image based on pixels each having the second brightness value higher than or equal to the first predetermined brightness threshold in the first face image.

5. The method of claim 3, said extracting the face highlight area from the highlight area based on the face key point information in the first face image comprising:
  extracting the face key point information from the first face image;
  determining the face area of the first face image based on the face key point information; and
  acquiring an overlapped area of the face area and the highlight area as the face highlight area.

6. The method of claim 5, further comprising:
  performing preliminary beauty processing on the face area, wherein the preliminary beauty processing comprises at least one of homogenizing skin color, buffing skin, eliminating dark circles, eliminating nasolabial folds, and brightening teeth.

7. The method of claim 5, said determining the face area of the first face image based on the face key point information comprising:
  determining a face contour in the first face image based on the face key point information;
  determining a facial feature area containing facial features in the first face image based on the face key point information;

determining an area other than the facial feature area in an area surrounded by the face contour as the face area.

8. The method of claim 2, said extracting the face highlight area from the first face image based on the first brightness value of each pixel, the first predetermined brightness threshold and face key point information in the first face image comprising:
   extracting the face key point information from the first face image;
   determining the face area of the first face image based on the face key point information; and
   extracting the face highlight area from the face area based on the first brightness value of each pixel and the first predetermined brightness threshold.

9. The method of claim 8, said extracting the face highlight area from the face area based on the first brightness value of each pixel and the first predetermined brightness threshold comprising:
   obtaining a second brightness value of each pixel in the face area by performing enhancement processing on the first brightness value higher than a second predetermined brightness threshold in the face area and performing decrement processing on the first brightness value lower than or equal to the second predetermined brightness threshold in the face area; and
   extracting the face highlight area from the face area based on pixels each having the second brightness value higher than or equal to the first predetermined brightness threshold in the face area.

10. The method of claim 8, further comprising:
    performing preliminary beauty processing on the face area, wherein the preliminary beauty processing comprises at least one of homogenizing skin color, buffing skin, eliminating dark circles, eliminating nasolabial folds, and brightening teeth.

11. The method of claim 8, said determining the face area of the first face image based on the face key point information comprising:
    determining a face contour in the first face image based on the face key point information;
    determining a facial feature area containing facial features in the first face image based on the face key point information;
    determining an area other than the facial feature area in an area surrounded by the face contour as the face area.

12. The method of claim 1, said obtaining a target face image by blending the third face image and the fourth face image comprising:
    for two pixels at the same position in the third face image and the fourth face image, performing weighted averaging on intensities of color channels R, G and B of the pixel in the fourth face image and intensities of color channels R, G and B of the pixel in the third face image, respectively; and
    determining weighted average values of the intensities of color channels R, G and B as intensities of color channels R, G and B of a corresponding pixel in the target face image.

13. The method of claim 1, further comprising:
    extracting a skin area from the target face image;
    for each pixel in the skin area, acquiring a difference between a full brightness value and a brightness value of the pixel, and determining a brightness enhancement magnitude of the pixel based on the difference and a predetermined brightness enhancing material; and
    performing brightness enhancement processing on each pixel in the skin area of the target face image based on the brightness enhancement magnitude of the pixel.

14. An electronic device, comprising:
    a processor,
    a memory, configured to store instructions executable by the processor;
    wherein the processor is configured to execute the instructions to implement the method for processing an image, comprising:
    acquiring a first face image, wherein the first face image is in a Lab color format;
    extracting a face highlight area from the first face image based on a brightness value of each pixel and face key point information in the first face image, wherein the face highlight area is an area having a brightness value not lower than a first predetermined brightness threshold in a face area of the first face image;
    obtaining a second face image by decreasing the brightness value of the face highlight area based on a predetermined highlight darkening parameter;
    obtaining a third face image by converting a color format of the second face image into a RGB color format and decreasing an intensity of each color channel of each pixel in the second face image;
    acquiring a fourth face image by converting a color format of the first face image into the RGB color format; and
    obtaining a target face image by blending the third face image and the fourth face image.

15. The electronic device of claim 14, said extracting a face highlight area from the first face image comprising:
    obtaining a first brightness value of each pixel by performing an exponential power operation on the brightness value of each pixel in the face image based on a predetermined power; and
    extracting the face highlight area from the first face image based on the first brightness value of each pixel, the first predetermined brightness threshold and the face key point information in the first face image.

16. The electronic device of claim 15, said extracting the face highlight area from the first face image based on the first brightness value of each pixel, the first predetermined brightness threshold and face key point information in the first face image comprising:
    extracting a highlight area from the first face image based on the first brightness value of each pixel and the first predetermined brightness threshold; and
    extracting the face highlight area from the highlight area based on the face key point information in the first face image.

17. The electronic device of claim 16, said extracting a highlight area from the first face image based on the first brightness value of each pixel and the first predetermined brightness threshold comprising:
    obtaining a second brightness value of each pixel by performing enhancement processing on the first brightness value higher than a second predetermined brightness threshold and performing decrement processing on the first brightness value lower than or equal to the second predetermined brightness threshold; and
    extracting the highlight area from the first face image based on pixels each having the second brightness value higher than or equal to the first predetermined brightness threshold in the first face image.

18. The electronic device of claim 16, said extracting the face highlight area from the highlight area based on the face key point information in the first face image comprising:

extracting the face key point information from the first face image;

determining the face area of the first face image based on the face key point information; and acquiring an overlapped area of the face area and the highlight area as the face highlight area.

19. The electronic device of claim 14, wherein the processor is further configured to execute following operations:

extracting a skin area from the target face image;

for each pixel in the skin area, acquiring a difference between a full brightness value and a brightness value of the pixel, and determining a brightness enhancement magnitude of the pixel based on the difference and a predetermined brightness enhancing material; and performing brightness enhancement processing on each pixel in the skin area of the target face image based on the brightness enhancement magnitude of the pixel.

20. A non-transitory computer-readable storage medium, wherein when instructions in the computer-readable storage medium are executed by a processor of an electronic device, the processor is caused to implement the method for processing an image, comprising:

acquiring a first face image, wherein the first face image is in a Lab color format;

extracting a face highlight area from the first face image based on a brightness value of each pixel and face key point information in the first face image, wherein the face highlight area is an area having a brightness value not lower than a first predetermined brightness threshold in a face area of the first face image;

obtaining a second face image by decreasing the brightness value of the face highlight area based on a predetermined highlight darkening parameter;

obtaining a third face image by converting a color format of the second face image into a RGB color format and decreasing an intensity of each color channel of each pixel in the second face image;

acquiring a fourth face image by converting a color format of the first face image into the RGB color format; and obtaining a target face image by blending the third face image and the fourth face image.

\* \* \* \* \*